INVENTOR:
Grant D. Anderson

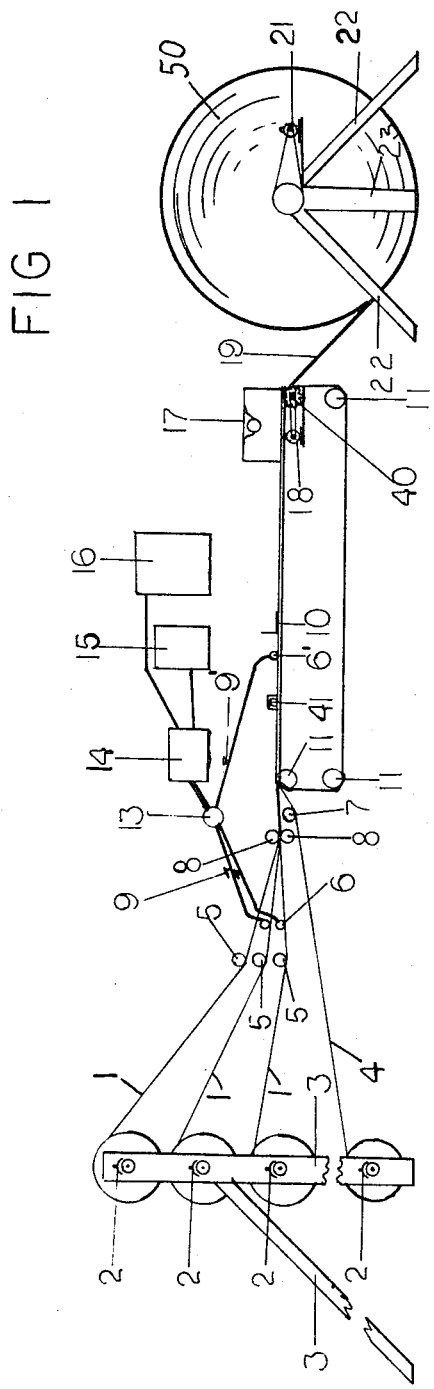
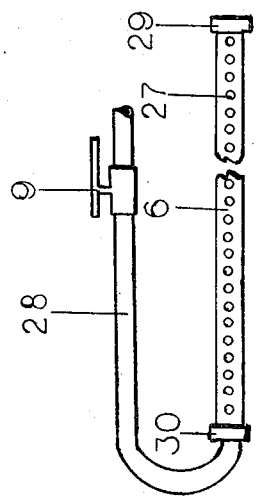
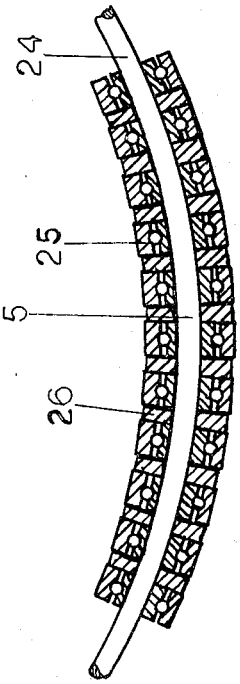

INVENTOR:
Grant D. Anderson

United States Patent Office 3,443,003
Patented May 6, 1969

3,443,003
METHOD AND APPARATUS FOR MAKING REINFORCED AND NON-REINFORCED ELASTOMERIC SHEET MATERIAL
Grant D. Anderson, 368 West 2725 South,
Bountiful, Utah 84010
Filed Jan. 29, 1965, Ser. No. 429,024
Int. Cl. B29d 29/00; B32b 31/30
U.S. Cl. 264—171      9 Claims

ABSTRACT OF THE DISCLOSURE

A conveyor belt-producing apparatus and method, the apparatus comprising (a) a table which carries a portion of a selectively movable, endless form comprising hingedly joined slats and (b) mixing and dispensing structure adapted to place mixed elastomeric components upon at least one continuous length of fabric reinforcement as the fabric moves with the table surface. A microwave curing oven adjacent the table solidifies the liquid elastomer so that it can be collected on a take-up mandrel. The method comprises continuously moving fabric with the movable forms comprising the table surface, despositing liquid elastomeric material upon the fabric within the forms, solidifying and collecting the finished conveyor belt.

---

The invention, in part, relates to apparatus for and method of making reinforced conveyor belts and non-reinforced rubber sheet in a continuous manner. While this apparatus hereinafter described may be used to manufacture sheets of rubber impregnated goods of various shapes and dimensions, its primary use is that of making rubber products in a continuous manner, utilizing liquid elastomers having two or more components that may be mixed together and cured to an insoluble elastomer.

Conveyor belts and sheet material made with conventional rubber equipment require a large amount of expensive machinery of a heavy-duty type. In order for conveyor belts and sheet goods to be manufactured via present-day equipment, crude rubber is processed on heavy-duty equipment simply to make the polymer semi-molten so that fillers can be incorporated, and so the crude rubber will flow into various shapes and dimensions, or spread over fabric reinforcement in a uniform manner. One of the best known types of processing equipment used to make conveyor belts and rubber sheet goods is the calendering machine, which requires much power and heat to obtain a uniform product. Calendered products must be stored within non-adhering liners so that they can be utilized in subsequent processes for the making of conveyor belts and sheet goods. Much manpower is involved in manipulating, calendering and processing these calendered products in production quantities for the making of conveyor belts and sheet goods and, since manufacturers require that conveyor belts be made by skilled manual labor, the cost of production is excessive.

It is therefore an object of this invention to provide a method and apparatus for making of conveyor belts and rubber sheet goods economically and in production quantities with a minimum of time and manpower, and which will overcome the above-mentioned drawbacks.

Another object of the present invention is to provide for making of one or more conveyor belts simultaneously in a continuous manner.

Another object of the present invention is to provide for making of conveyor belts rapidly, utilizing the so-called fast curing ovens.

These and other objects and advantages of this invention will appear more clearly from this specification and claims in conjunction with the drawings, in which:

FIGURE 1 is a schematic side elevational view of one embodiment of the apparatus according to the present invention;

FIGURE 2 is a longitudinal section of a fabric straightener roll for producing composite sheet material in accordance with the present invention;

FIGURE 3 is a fragmentary bottom view of a perforated tube with the apertures through which elastomer in a liquid state passes;

Figure 4:
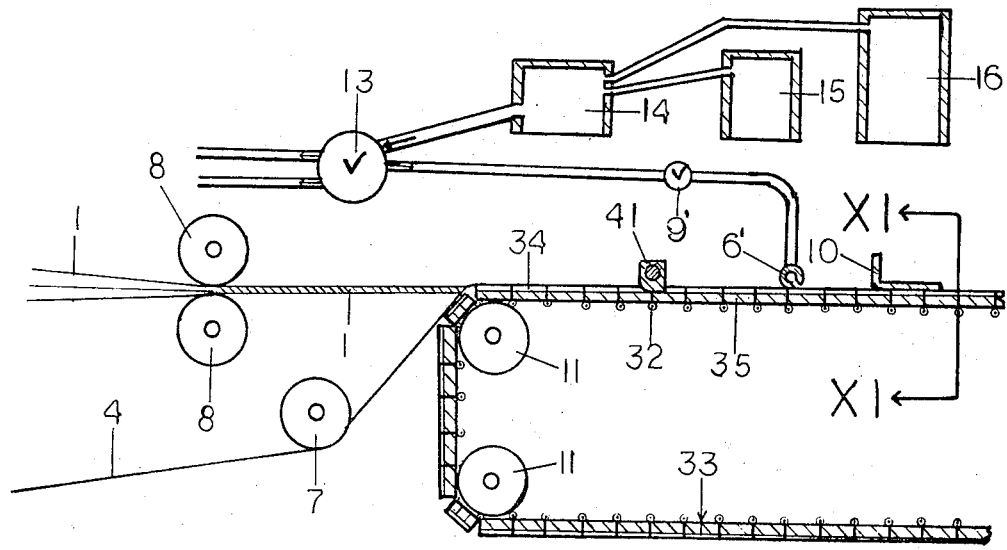
FIGURE 4 is a fragmentary schematic view of a portion of the liquid elastomer feed system shown in partial cross-section.

Generally, the method and apparatus of my invention comprises the making of composite sheet material or elastomeric sheet material by casting a liquid synthetic elastomer, preferably of material selected from the chemical group known as polyurethanes, onto a continuously moving endless flat conveyor table. Plies of fabric are impregnated with the liquid elastomer and united with the cast liquid elastomer which is then polymerized to a solid state, preferably with a quick-curing oven which utilizes high frequencies. The high frequencies presently preferred are radio frequencies in the microwave range. The cast elastomer is preferably placed onto a non-adhering type of surface to prevent adherence to the moving conveyor table, and subsequently gathered progressively as a finished conveyor belt or rubber sheet goods. Loosely woven nylon, rayon and cotton fabrics are the preferred type of reinforcement material for making of conveyor belts because they allow the liquid elastomer to penetrate the interstices of the layers of the fabric. If desired, any fabric, metallic or nonmetallic, or combination thereof, may be employed as the reinforcement so long as the fabric is essentially non-extensible. Therefore, fibrous material of any kind and texture, natural or synthetic, may be utilized as reinforcement material within the scope of the present invention. Release paper is a presently preferred non-adhering surface onto which the cast elastomer may be placed. It may be taken off the finished product prior to final take-up on a mandrel, or it may be taken off at a later time if there is danger of the finished product sticking to itself upon being gathered up in large sections. More than one conveyor belt can be manufactured during one operation by utilizing additional spacers to divide the width of the casting area within the conveyor table of this apparatus.

The method performed in producing conveyor belts and sheet goods is composed of four principle steps. The first step comprises supplying the reinforcement fabric, release paper and the fabric straightening units simultaneously into the apparatus to provide the reinforcement and release of the cured conveyor belt. The second step comprises mixing elastomer components and applying the liquid elastomer between the fabric plies and on the top of the conveyor belt and the leveling of the liquid elastomer. The third step comprises curing the elastomer in a polymerizing chamber by power driving the conveyor table section containing the liquid elastomer continuously through the chamber, where it is heated and polymerized to an elastomeric state. The fourth step comprises gathering the finished belt under constant tension.

Referring now to the drawings in detail, FIGURE 1 shows a three ply conveyor belt being made with the present apparatus in accordance with the present method.

FIGURE 2 shows a longitudinal section of a fabric straightener roll 5. The fabric straightener roll 5 is composed of many roller bearings 25 between which are placed spacers 26, alternately spaced over a concavely rounded shaft 24. The crest of the fabric straightener roll 5 is facing downward against the fabric 1. Fabric straightener rolls 5 can be easily removed if desired. Fabric passing over the fabric straightener roll 5 is braked or tensioned by brake structure 2, so that the fabric 1 evolves from the straightener roll 5 in a suitable wrinkle free condition.

FIGURE 3 shows a bottom view of a perforated tube 6 through which liquid elastomer is applied between plies of fabric 1. Feeder tube 6' as shown in FIGURE 1 is identical to tube 6 except the perforated holes 27 are slightly larger to accommodate a greater volume of flow of liquid elastomer needed in the area where the perforated feeder tube 6' is being used. The perforated feeder tubes 6 and 6' are formed from standard pipe and are capped on the terminating end 29 for easy cleaning when required. Each tube is provided with a female attachment 30 onto which a liquid elastomer feeder tube is connected. A control valve 9 for the controlling of the flow of liquid elastomer through the holes 27 of the perforated feeder tubes 6, 6' is located in the feeder tube.

FIGURE 4 shows a cross-sectional view of the liquid elastomer feed system with pressure rolls 8 in place. The pressure rolls 8 are utilized to displace entrapped air and to force liquid elastomer into the interstices of the fabric, and to insure that the fabrics are in intimate contact with each other. The centerline of the departing fabrics 1 emerging from the pressure rolls 8 is slightly lower than the conveyor table 33. An idler roller 7 directs the release paper 4 toward the conveyor table 33 and is provided to prevent the release paper 4 from coming in contact with the pressure rolls 8. The release paper folding guide assembly 41 is shown in place and is shown in greater detail in FIGURE 8.

Liquid elastomer resin 16 and catalyst 15 are supplied to the mixing machine 14 which in turn supplies the mixed liquid elastomer under moderate pressure to a multi-valve 13. The mixed elastomer is then distributed as required to the perforated feed tubes 6 and 6' for dispensing the liquid elastomer between the fabric plies and on the top cover of the conveyor belt 19. The perforated feeder tube 6' fills the cavity within the conveyor table 33 with a slight excess of liquid elastomer which is leveled with the adjustable screed 10. Screed 10 could also be a so-called "doctor-blade." The conveyor table 33 revolves around the periphery of the idle rollers 11 and the hinges 32 which connect the separate units 35 of the table surface 33 are shown in place.

Figure 5:
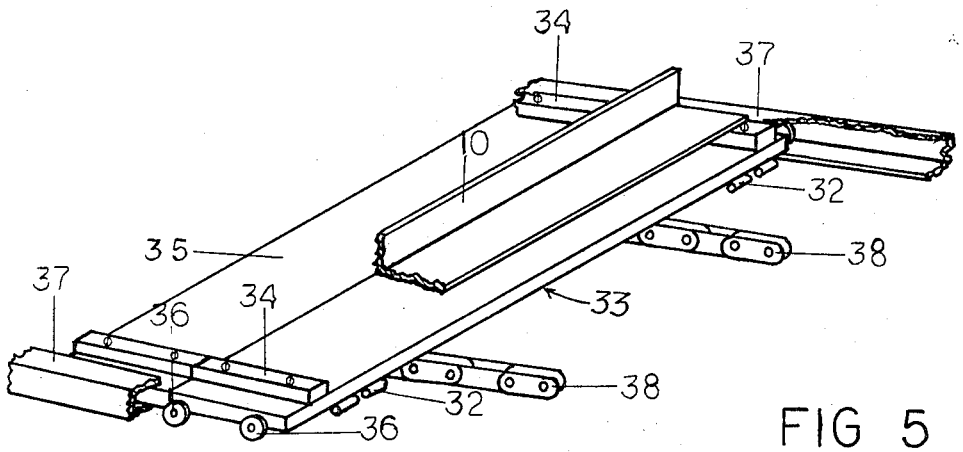
FIGURE 5 is a fragmentary perspective view of a section along the line XI—XI of FIGURE 4.

FIGURE 5 shows a detailed perspective view, generally taken in the direction of XI—XI, of two units 35 of the flat endless conveyor table surface 33 shown as rigid slat members. The U-channel 37 is shown along with rollers 36 which support each rigid slat member 35 and permits the conveyor table 33 (FIGURE 4) to be conveyed with less power. FIGURE 5 also shows the drive chains 38 in place. Both the drive chains and the hinged slat members are jointed so that the conveyor table 33 proceeds in a continuous manner over the idle rollers 11 (FIGURE 4). As is vividly shown in FIGURE 5 the spacer blocks 34 are removable so that spacer blocks of various thicknesses can be used to manufacture conveyor belts of differing thicknesses. Of course, the spacer blocks 34 can be placed at various intervals along each rigid slat member 35 in order to make more than one conveyor belt at a time. A top view showing more than one set of spacer blocks 34 in place is shown in greater detail in FIGURE 7.

Figure 6:
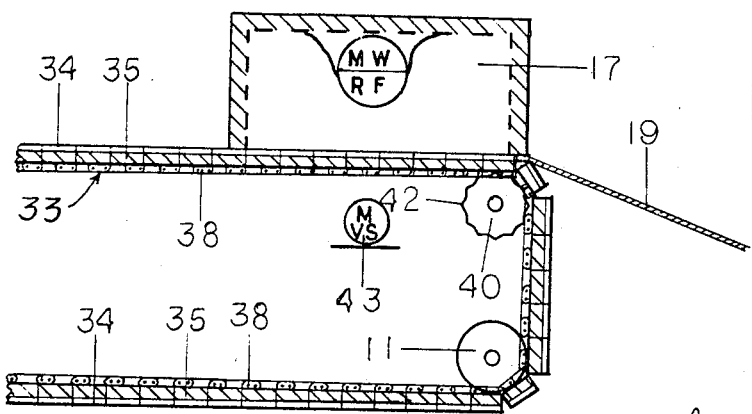
FIGURE 6 is a fragmentary cross-sectional view of a portion of the endless conveyor table and drive, and the curing chamber.

FIGURE 6 vividly shows a cross-sectional view of the powered section of the conveyor table 33 drive system 40 and the polymerizing chamber 17. The conveyor table drive system 40 has an electric motor 43 which drives the sprocked gear 42 which engages with the drive chain 38 for the powering of the conveyor table 33 in a continuous manner. Only one idler roller 11 is provided in this portion of the conveyor table 33 as the conveyor table drive system 40 provides for supporting the upper peripheral portion for the conveying of the conveyor table 33 in accordance with the present invention. FIGURE 6 also shows the finished conveyor belt 19 emerging from the polymerization chamber 17.

Figure 7:
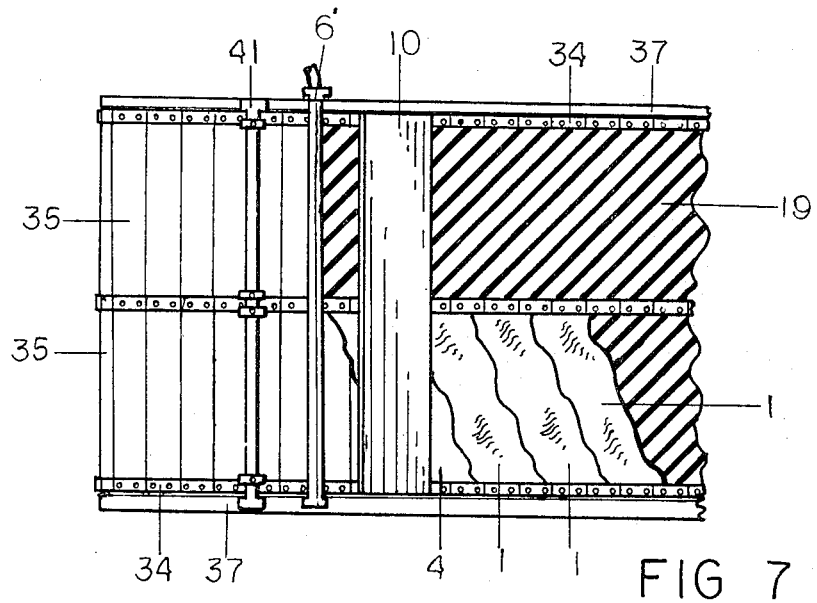
FIGURE 7 is a top plan view of two conveyor belts being formed by the apparatus of FIGURE 1, with parts of the formed conveyor broken away to reveal subsurface layers.
Figure 8:
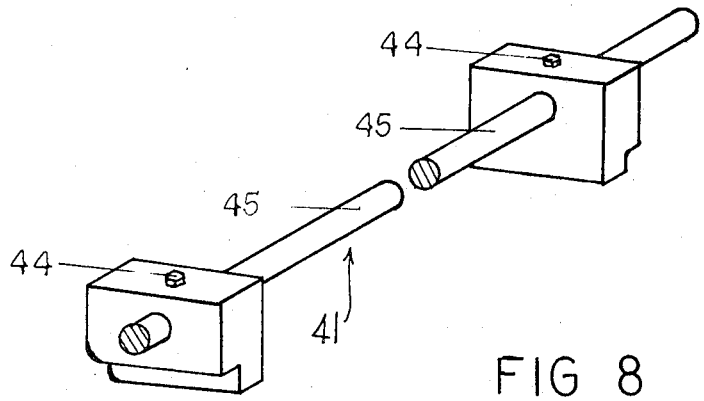
FIGURE 8 is an enlarged fragmentary perspective view of a portion of a release paper folding unit shown in FIGURE 7.

FIGURE 7 shows by a top plan view two conveyor belts of approximately equal width being made in accordance with the present invention, one portion being cutaway to show the release paper 4, three fabric plies 1 and the finished conveyor belt 19 in place. As is evidenced in this drawing the release paper folding unit 41 is located close to the screed 10 in order that the outer edges of the release paper 4 will be under no strain during folding of the release paper 4. A more detailed drawing of this release paper folding unit 41 is shown in FIGURE 8. As is evidenced in FIGURE 7 the screed 10 rides over a small portion of the release paper 4 which is folded over against the vertical wall of the spacer blocks 34 to produce a conveyor belt 19 having uniform edges.

FIGURE 8 shows a perspective view of a portion of the release paper folding unit 41, with the shaft 45 and the adjusting bolt 44 in place. The leading edge of the release paper folding unit 41 is gently tapered so that the release paper 4 will not wrinkle or tear when the release paper 4 enters the release paper folding unit 41. As is evidenced from this drawing the exit portion of the release paper folding unit 41 has square exit angles so that the fold is uniform and square, as the release paper 4 progresses through the release paper folding unit 41 in a continuous manner.

For purposes of carrying out the method to produce composite sheet material and elastomeric sheet goods with the present apparatus, the following procedure can be used to produce elastomeric goods within the scope of the present invention.

First the apparatus must be readied for producing elastomeric goods by loading resin 16 and catalyst 15 into the containers provided. Next the width and height of the product to be made is determined by adjusting the position of the outer boundaries 34 to accommodate the desired width and height.

Next, the lower surface release paper 4 is put on the holding rack 3 and threaded under the idle roller 7, up and over the conveyor table 33, under the release paper folding unit 41 and under the liquid elastomer perforated feeder tube 6', under the screed 10, through the polymerization chamber 17 and to a mandrel 50 provided on the holding rack 23 where it is securely attached.

If composite sheet material is to be made, proceed as follows: First determine the number of fabric plies 1 to be used and put these fabrics 1 in place on the holding rack 3. Then put a corresponding number of fabric straightener units 5 into place and one less than a corresponding number of perforated feeder tubes 6 into place. Next thread the fabric plies 1 through the underside of the fabric straightener units 5, past the perforated feeder tubes 6 so that one perforated feed tube 6 is between each ply of fabric 1. After passing this point the fabric plies 1 come into intimate contact by passing through the pressure rolls 8 and over the already in place lower surface release paper 4 which is then under the release paper folding unit 41. The fabric is placed under the liquid, elastomer perforated feeder tube 6', the screed 10 and through the polymerization chamber 17. The fabric is then securely attached to the mandrel provided on the holding rack 23.

After the fabric 1 and release paper 4 are in place the entire unit is turned on to produce composite sheet material. The brakes 2 are actuated to cause tension on the fabric 1 and the release paper 4. The liquid elastomer mixing unit 14 is actuated and adjusted to regulate the flow of elastomer through valves 9, 9' and the perforated feeder tubes 6, 6'. The release paper folding unit 41 and the screed 10 are adjusted and the power in the polymerization chambed 17 is turned on. The conveyor table 33 is then set in motion via the power motor 43 working in unison with the powered motor 21. As the composite sheet proceeds through the present invention the operator adjusts the valves 9, 9', so that liquid elastomer completely fills the cavity between the outer boundaries 34 with a slight excess of liquid elastomer. The screed 10 is adjusted to just clear the top surface of each outer boundary 34 to prevent the slight excess of liquid elastomer from passing through the exit edge of the screed 10 and to make a level void-free surface. As the composite sheet progresses past the screed 10 the composite sheet enters the polymerization chamber 17 where the elastomer is set. The composite sheet material then proceeds from the polymerization chamber 17 to be gathered progressively, under slight tension provided by the powered motor 21, on the mandrel carried by the holding rack 23. If an additional layer of liquid elastomer is desired on the surface opposite the upper-most top layer, the finished composite sheet is taken from the mandrel and holding rack 23 and transferred to holding rack 3, which has previously been stripped of the fabric 1. The fabric straightener units 5, the forward perforated feeder tubes 6 and the pressure rolls 8 are removed or fixed into a position whereby the composite sheet material will not come in contact. The composite sheet material is allowed to pass again through the present invention as described above to receive the additional layer of elastomeric material. Of course, the outer boundaries 34, as well as the screed 10 is adjusted to accommodate the additional height of said layer of required material.

If non-reinforced elastomeric sheet material is to be made, the same procedure above described is used, except no fabric reinforcement is placed on the conveyor table 33.

It should be noted that the polymerization chamber 17, the liquid elastomer mixing unit 14, the powered motor 43 for driving the conveyor table 33 and the powered motor 21 are all driven via one power source. Therefore, when one of these units shuts off, the other units are shut off simultaneously.

To those skilled in the art of making conveyor belts and sheet goods it is apparent that the present apparatus has many advantages over that of the present methods of manufacturing conveyor belts and sheet goods. It can also be realized that the present apparatus is many times less costly than equipment needed to produce conveyor belts and sheet goods on conventional rubber processing equipment, and that the present invention utilizes less manpower, less processing time and yet will produce conveyor belts and rubber goods in a continuous manner and of better quality and reliability than present day manufacturers of these goods. The present invention also makes it possible to manufacture more than one conveyor belt each having a different width and hence additional savings are realized. Because of the toughness of elastomers that can be utilized within the scope of this invention, end products may be made which have thinner cross sections of elastomer with a commensurate savings in power and materials.

In view of the foregoing it will be apparent to those skilled in the art that I have accomplished all the objects of my invention, and it will also be apparent to those skilled in the art that the embodiment herein described may be variously changed and modified without departing from the spirit of my invention, and that the present invention has uses and advantages not herein and specifically described. Furthermore, the manufacturing of conveyor belts and sheet goods using the method described in this invention is not limited to the apparatus described herein, hence it will be appreciated that the herein disclosed embodiment is illustrative only and that my invention is not limited thereto. Obviously the materials used in the manufacture of conveyor belts and sheet goods can be made from any liquid or thermoplastic elastomer and the fabric can be of any substance be it metallic or non-metallic, and further, the release agent can be made of coated paper, plastics, etc., to provide a non-adhering type of surface, likewise the conveyor table can be made of material be it metallic or non-metallic. Consequently, in the following claims I will use the words: elastomer, fabric, release paper and conveyor table to include all these materials.

What is claimed and desired to be secured by United States Letters Patent is:

1. In an apparatus for making a continuous length of conveyor belt comprising a stationary table which carries an endless casting form power driven across the upper portion of the table, the form comprising a plurality of essentially rigid slats, each of which is provided with outwardly projecting boundaries and is hinged to each adjacent slat for relative bending movement therebetween, the edges of each slat being provided with antifriction structure to accommodate free relative movement between the casting form and the table;

at least one feeding mandrel for continuously supplying release paper to cover a selected upper portion of the endless casting form and at least one feeding mandrel for optionally providing a continuous length of reinforcement fabric to the selected upper portion of the endless form;

mixing structure for selectively and continuously mixing components of liquid elastomeric material and tube and valve structure for applying the multi-component liquid elastomeric material to a portion of the release paper immediately adjacent the endless form and for selectively applying the material to fabric reinforcement at a location forward of the table at a point in time before the fabric reaches the endless form;

structure adapted to polymerize the liquid elastomeric material while it is being carried by the endless form; and at least one take-up mandrel for continuously collecting the polymerized material.

2. In an apparatus as defined in claim 1 wherein the endless casting form further comprises a chain-drive mechanism for selectively continuously displacing a portion of the endless form across the upper portion of the stationary table.

3. In an apparatus as defined in claim 1 wherein the outwardly projecting boundaries carried by each rigid slat comprises structure for adjusting the relative position of the boundaries on the slat whereby the distance between the outer boundaries may be selectively changed to set any one of a plurality of desired widths of conveyor belt.

4. In an apparatus a defined in claim 3 wherein the outwardly projecting boundaries comprises at least three separate components defining at least two separate casting forms whereby a plurality of conveyor belts may be made simultaneously.

5. In an apparatus as defined in claim 1 wherein the antifriction structure comprises roller and track structure, the rollers being rotatably journaled to each slat and adapted to ride smoothly upon tracks presented by the table.

6. In an apparatus as defined in claim 1 further comprising structure for removing the release paper from the polymerized material prior to the collection thereof by the take-up mandrel.

7. In a method of producing conveyor belts in a continuous manner the steps of continuously covering a selected portion of endless moving form with release paper configured to assume the outward shape of the form, mixing components of elastomeric material and applying the mixed material to the portion of the release paper carried by the form, curing the liquid material continuously as the endless form carries the liquid material into an area of exposure by a quick-curing, high frequency oven to produce a solid elastomeric belt, and collecting the solidified 8. In a method as defined in claim 7 wherein said applying step is preceded by applying liquid elastomeric material to a continuous length of reinforcement fabric and placing the reinforcement fabric upon the release paper prior to applying the mixed material directly to the release paper.

9. In a method as defined in claim 7 wherein the collecting step is preceded by removing the release paper from the solidified elastomeric belt.

References Cited

UNITED STATES PATENTS

| | | | |
|---|---|---|---|
| 1,787,404 | 12/1930 | Taylor et al. | |
| 2,500,728 | 3/1950 | Williams | 264—175 XR |
| 2,784,763 | 3/1957 | Shorts | 156—247 XR |
| 3,042,568 | 7/1962 | Ludowici et al. | 156—543 XR |
| 3,230,125 | 1/1966 | Hicks | 156—324 XR |
| 3,278,667 | 10/1966 | Knox | 264—171 |

FOREIGN PATENTS 1,129,680   5/1962   Germany.

PHILIP DIER, *Primary Examiner.*

U.S. Cl. X.R.

18—4; 156—245, 247, 273, 324, 500, 543; 264—213, 257

PO-1050
(5/69)

UNITED STATES PATENT OFFICE
CERTIFICATE OF CORRECTION

Patent No. 3,443,003          Dated May 6, 1969

Inventor(s)   Grant D. Anderson

It is certified that error appears in the above-identified patent and that said Letters Patent are hereby corrected as shown below:

> Column 7, line 6, after the word "solidified" insert --elastomeric belt.--

SIGNED AND
SEALED

AUG 26 1969

E. __ __ Fletcher, Jr.
Attesting Officer

WI__ __ __ __, JR.
Commissioner of Patents